US009047412B2

(12) United States Patent
Greifeneder et al.

(10) Patent No.: US 9,047,412 B2
(45) Date of Patent: Jun. 2, 2015

(54) SYSTEM AND METHOD FOR EXTRACTING INSTRUMENTATION RELEVANT INHERITANCE RELATIONSHIPS FOR A DISTRIBUTED, INHERITANCE RULE BASED INSTRUMENTATION SYSTEM

(71) Applicant: Compuware Corporation, Detroit, MI (US)

(72) Inventors: Bernd Greifeneder, Linz (AT); Christian Schwarzbauer, Linz (AT); Rainer Klaffenbock, Linz (AT)

(73) Assignee: Dynatrace Corporation, Detroit, MI (US)

( * ) Notice: Subject to any disclaimer, the term of this patent is extended or adjusted under 35 U.S.C. 154(b) by 264 days.

(21) Appl. No.: 13/775,621

(22) Filed: Feb. 25, 2013

(65) Prior Publication Data

US 2013/0179868 A1     Jul. 11, 2013

Related U.S. Application Data

(63) Continuation-in-part of application No. 11/744,876, filed on May 6, 2007, now Pat. No. 8,464,225.

(51) Int. Cl.
  *G06F 9/44* (2006.01)
  *G06F 11/36* (2006.01)
(52) U.S. Cl.
  CPC ........ *G06F 11/3668* (2013.01); *G06F 11/3624* (2013.01); *G06F 11/3644* (2013.01); *G06F 11/3604* (2013.01)
(58) Field of Classification Search
  USPC ........................................................ 717/130
  See application file for complete search history.

(56) References Cited

U.S. PATENT DOCUMENTS

| 5,432,932 | A | 7/1995 | Chen |
| 5,727,147 | A | 3/1998 | vanHoff |
| 5,781,778 | A | 7/1998 | Meier |
| 5,794,046 | A | 8/1998 | Meier |
| 5,867,712 | A | 2/1999 | Shaw |
| 5,933,639 | A | 8/1999 | Meier |
| 5,953,530 | A | 9/1999 | Rishi |
| 6,101,524 | A | 8/2000 | Choi |

(Continued)

OTHER PUBLICATIONS

Mikhail Dmitriev, "Design of JFluid: A Profiling Technology and Tool Based on Dynamic Bytecode Instrumentation," Sun Microsystems, 2003, http://delivery.acm.org/10.1145/1700000/1698174/smli_tr-2003-125.pdf pp. 1-22.

(Continued)

*Primary Examiner* — Hang Pan
(74) *Attorney, Agent, or Firm* — Harness, Dickey & Pierce, P.L.C.

(57) ABSTRACT

The presented enhancement of a rule based instrumentation system taking object oriented inheritance relationships into account is directed to the detection and extraction to inheritance relationships relevant for the instrumentation process. Relevant inheritance relationships which have an impact on the instrumentation process and typically only represent a small fraction of the complete inheritance relationships of a monitored application. The small size of the relevant inheritance relationships allows, for example to prepare it in advance and ship it as part of a monitoring application or to transmit inheritance information between different local instrumentation engines being part of a distributed instrumentation system.

23 Claims, 16 Drawing Sheets

(56) References Cited

U.S. PATENT DOCUMENTS

| | | | |
|---|---|---|---|
| 6,102,966 A | 8/2000 | Tyma | |
| 6,134,603 A | 10/2000 | Jones | |
| 6,145,121 A | 11/2000 | Levy | |
| 6,151,639 A | 11/2000 | Tucker | |
| 6,202,199 B1 | 3/2001 | Wygodny | |
| 6,266,805 B1 | 7/2001 | Nwana | |
| 6,332,212 B1 | 12/2001 | Organ | |
| 6,539,541 B1 | 3/2003 | Geva | |
| 6,721,941 B1 | 4/2004 | Morshed | |
| 6,754,890 B1 | 6/2004 | Berry | |
| 6,760,903 B1 | 7/2004 | Morshed | |
| 6,795,962 B1 | 9/2004 | Hanson | |
| 6,862,711 B1 | 3/2005 | Bahrs | |
| 6,961,926 B2 | 11/2005 | Koyama | |
| 6,968,540 B2* | 11/2005 | Beck et al. | 717/130 |
| 6,978,444 B1 | 12/2005 | Farchi | |
| 7,143,392 B2 | 11/2006 | Li | |
| 7,162,710 B1 | 1/2007 | Edwards | |
| 7,263,689 B1 | 8/2007 | Edwards | |
| 7,293,259 B1 | 11/2007 | Dmitriev | |
| 7,293,260 B1 | 11/2007 | Dmitriev | |
| 7,367,025 B1 | 4/2008 | Nikolov | |
| 7,376,940 B1 | 5/2008 | Bush | |
| 7,380,239 B1 | 5/2008 | Srivastava | |
| 7,409,676 B2 | 8/2008 | Agarwal | |
| 7,493,607 B2 | 2/2009 | Moritz | |
| 7,496,903 B2 | 2/2009 | Rees | |
| 7,500,227 B1 | 3/2009 | Fontana | |
| 7,526,760 B1 | 4/2009 | Daynes | |
| 7,529,780 B1* | 5/2009 | Braginsky et al. | 1/1 |
| 7,685,183 B2 | 3/2010 | Pace | |
| 7,818,721 B2 | 10/2010 | Sundararajan | |
| 7,950,004 B2 | 5/2011 | Vieira | |
| 7,957,934 B2 | 6/2011 | Greifeneder | |
| 7,992,133 B1 | 8/2011 | Theroux | |
| 7,992,134 B2 | 8/2011 | Hinchey | |
| 8,032,872 B2 | 10/2011 | Violleau | |
| 8,037,458 B2 | 10/2011 | Shekov | |
| 2001/0004766 A1 | 6/2001 | Koyama | |
| 2002/0032754 A1 | 3/2002 | Logston | |
| 2002/0174415 A1 | 11/2002 | Hines | |
| 2002/0199173 A1 | 12/2002 | Bowen | |
| 2003/0056200 A1 | 3/2003 | Li | |
| 2004/0010570 A1 | 1/2004 | Kaler | |
| 2004/0064484 A1* | 4/2004 | Polan et al. | 707/200 |
| 2004/0093588 A1 | 5/2004 | Gschwind | |
| 2005/0039171 A1 | 2/2005 | Avakian | |
| 2005/0039172 A1 | 2/2005 | Rees | |
| 2005/0039186 A1 | 2/2005 | Borkan | |
| 2005/0039187 A1 | 2/2005 | Avakian | |
| 2005/0039190 A1 | 2/2005 | Rees | |
| 2005/0086656 A1* | 4/2005 | Whitlock et al. | 718/1 |
| 2005/0223367 A1 | 10/2005 | Smith | |
| 2005/0278706 A1 | 12/2005 | Garza | |
| 2005/0283522 A1 | 12/2005 | Parkkinen | |
| 2006/0069682 A1 | 3/2006 | Fanous | |
| 2006/0271395 A1 | 11/2006 | Harris | |
| 2006/0271542 A1 | 11/2006 | Harris | |
| 2006/0271575 A1 | 11/2006 | Harris | |
| 2006/0271930 A1 | 11/2006 | Letizi | |
| 2006/0271931 A1 | 11/2006 | Harris | |
| 2007/0011667 A1 | 1/2007 | Subbiah | |
| 2007/0069005 A1 | 3/2007 | Dickerson | |
| 2007/0088762 A1 | 4/2007 | Harris | |
| 2007/0143323 A1 | 6/2007 | Vanrenen | |
| 2007/0143743 A1 | 6/2007 | Cobb | |
| 2007/0169055 A1 | 7/2007 | Greifeneder | |
| 2007/0180439 A1 | 8/2007 | Sundararajan | |
| 2008/0276227 A1 | 11/2008 | Greifeneder | |
| 2008/0288212 A1 | 11/2008 | Greifeneder | |
| 2008/0288962 A1 | 11/2008 | Greifeneder | |
| 2009/0049429 A1 | 2/2009 | Greifeneder | |
| 2012/0304172 A1 | 11/2012 | Greifeneder | |

OTHER PUBLICATIONS

Mikhail Dmitriev, "Selective Profiling of Java Applications Using Dynamic Bytecode Instrumentation," IEEE, 2004 <http://ieeexplore.ieee.org/stamp/stamp.jsp?tp=&arnumber=1291366> pp. 141-151.

Parker Abercrombie et al., "jContractor: Bytecode Instrumentation Tevchniques for Implementing Design by Contract in Java," UCSB, Aug. 2004, <http://jcontractor.sourceforge.net/doc/jContractor_RV02.pdf> pp. 1-25.

Kuang et al., "E AHRW: An energy efficient adaptive hash scheduler for stream processing on multicore servers," IEEE, pp. 45-56, 2011.

Prabhu et al, "Using thread level speculation to simplify manual parallelization," ACM PPoPP, pp. 1-12, 2003.

Ntarmos et al, "Distributed hash sketches: scalable efficient and accurate cardinality estimation for distributed multisets," ACM Trans. On Comput. Sys. vol. 27, No. 1, article 2, pp. 1052, 2009.

Olivier et al, "Scheduling task parallelism on multi socket multicore systems", ACM ROSS, pp. 49-56, 2011.

Andrew Z. Tobona, Windows 2003 performance monitor, pp. 1-8, Publish Mar. 29, 2004.

* cited by examiner

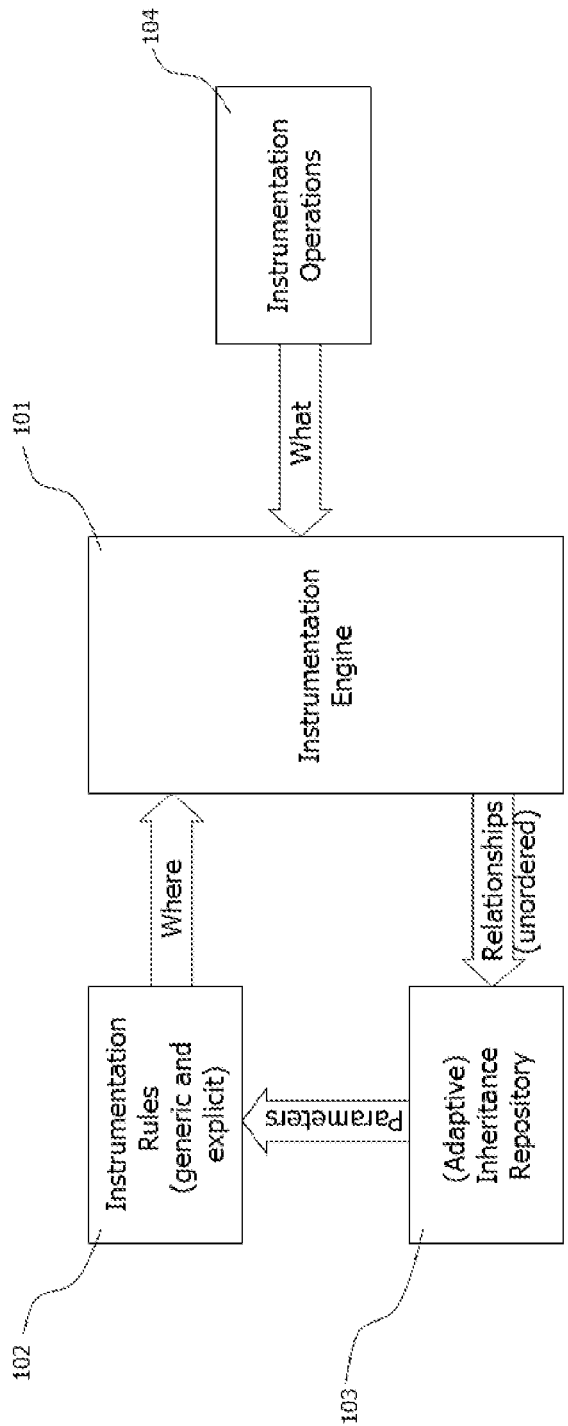
FIG 1: Instrumentation Meta-Information

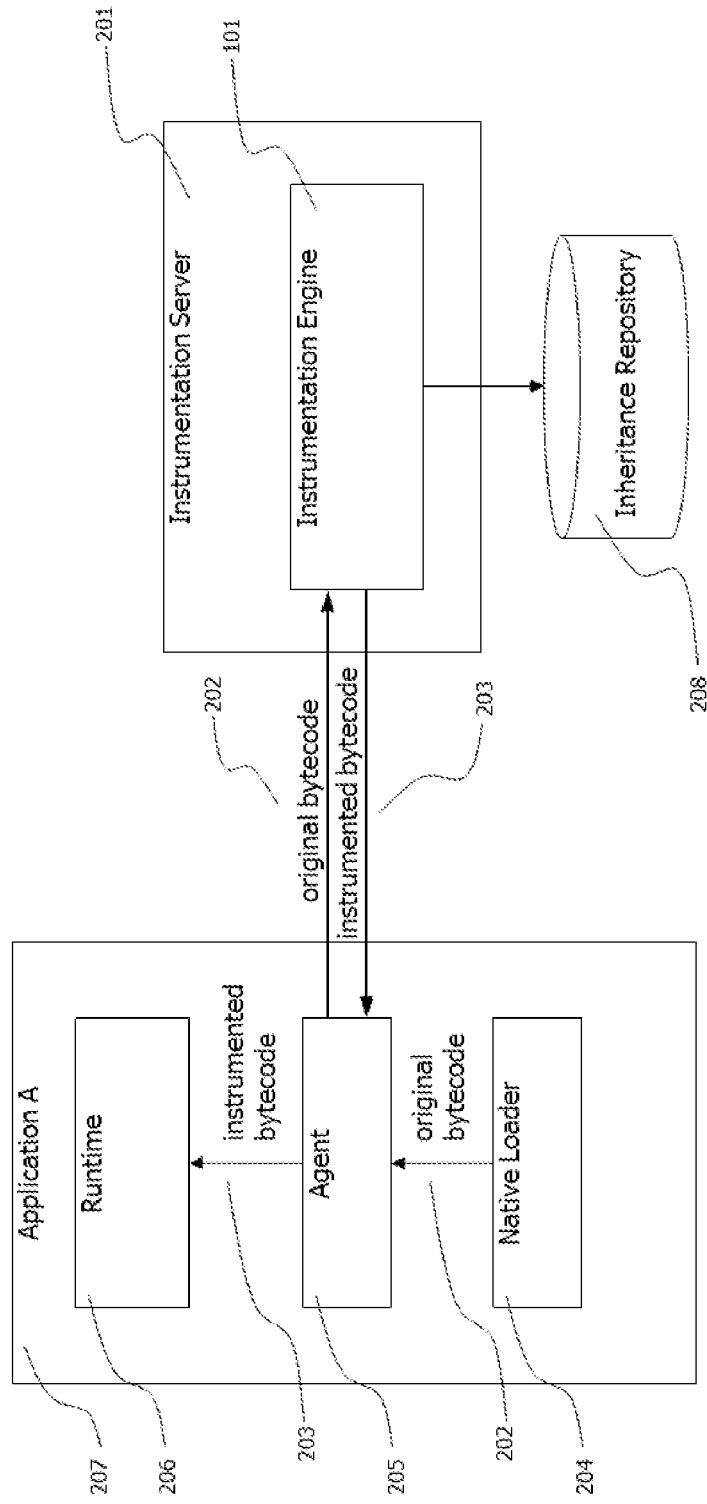

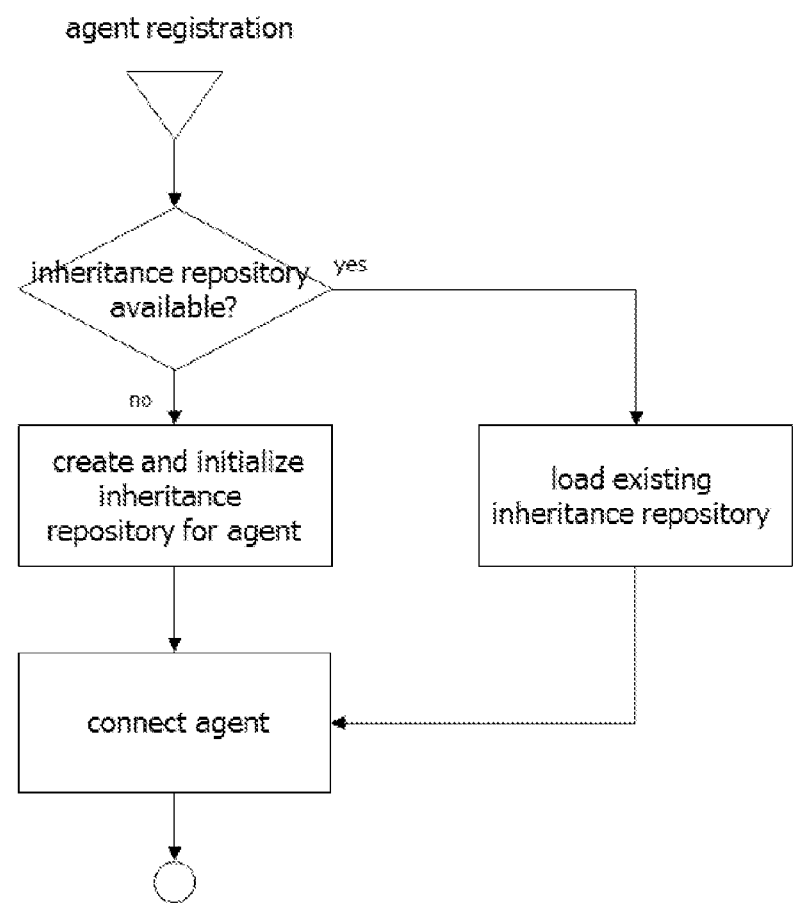
FIG 3: Initialize Inheritance Repository

FIG 4: Inheritance Repository Node (IRN)
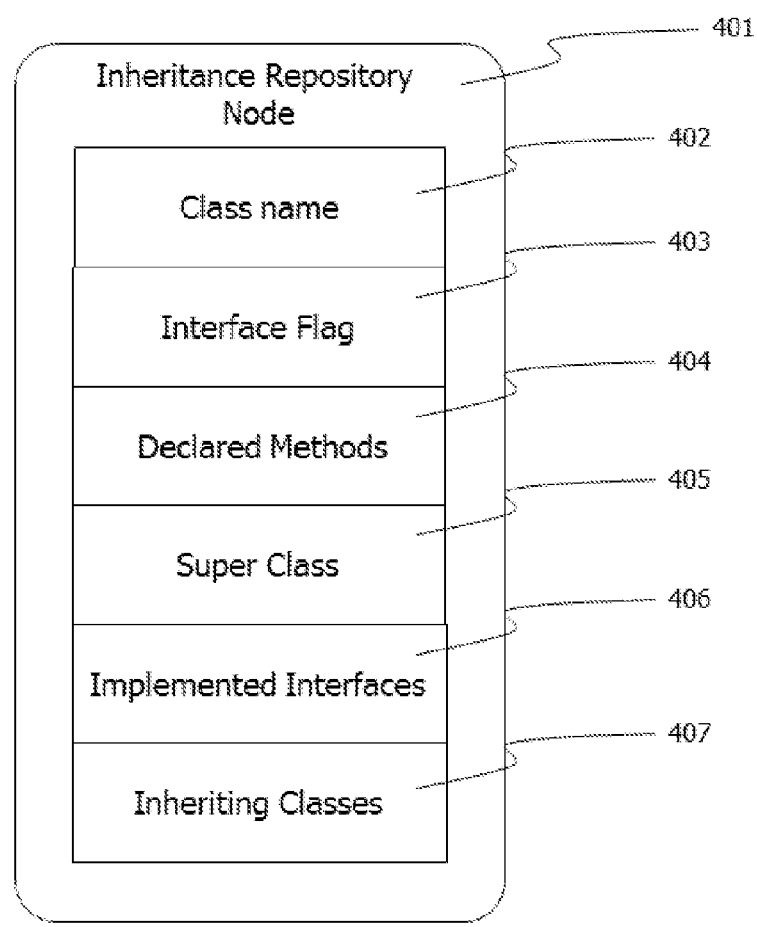

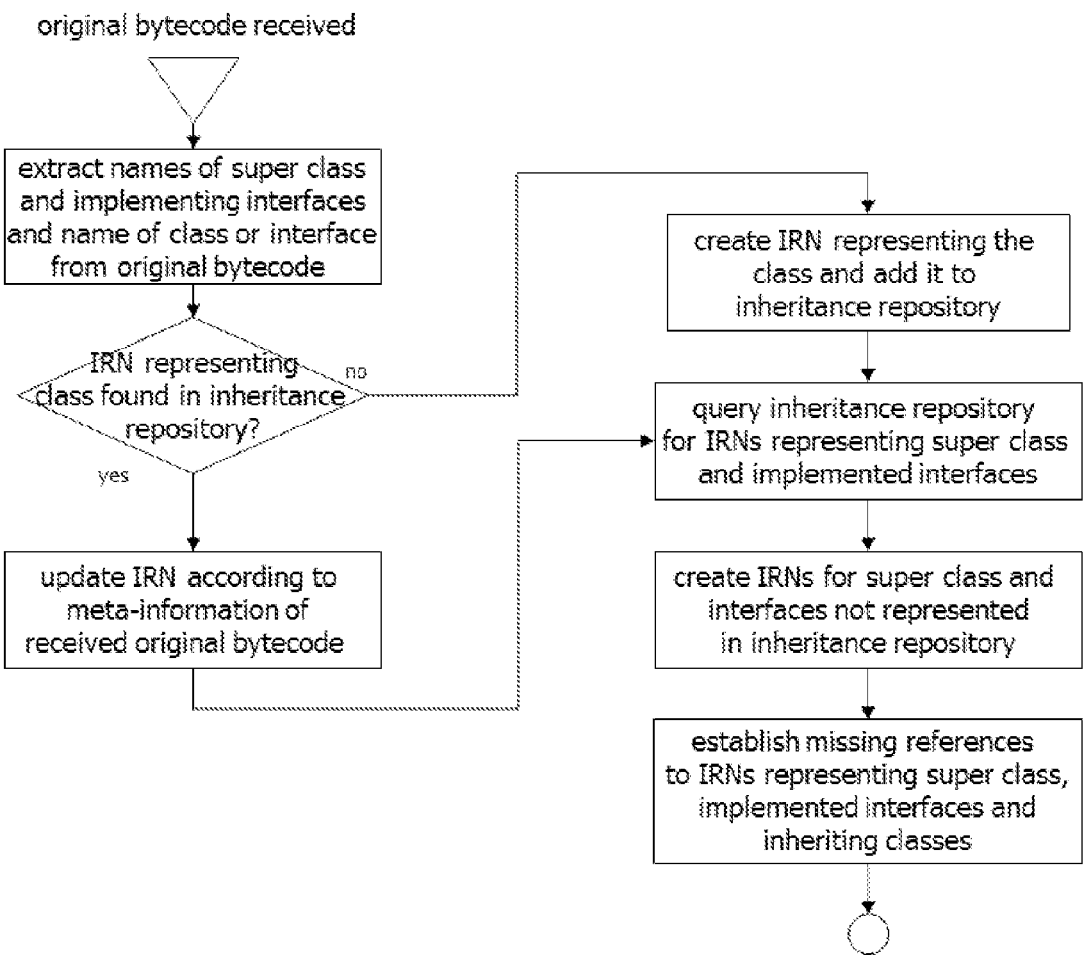

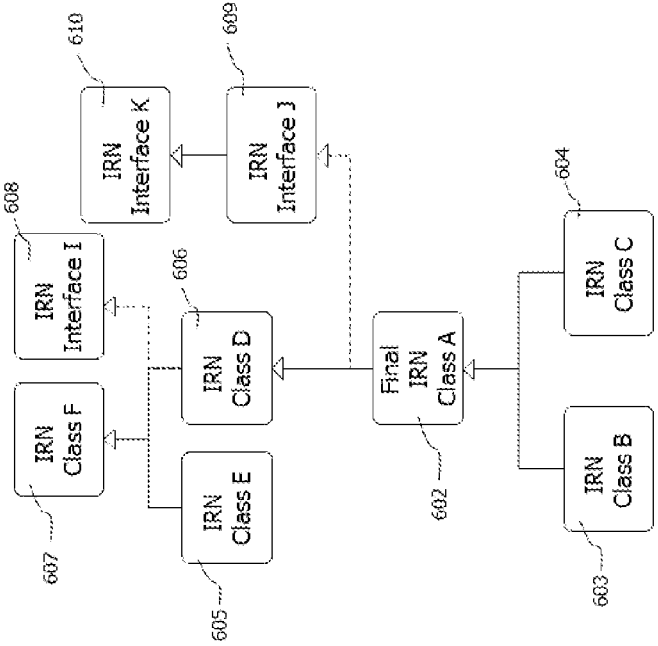
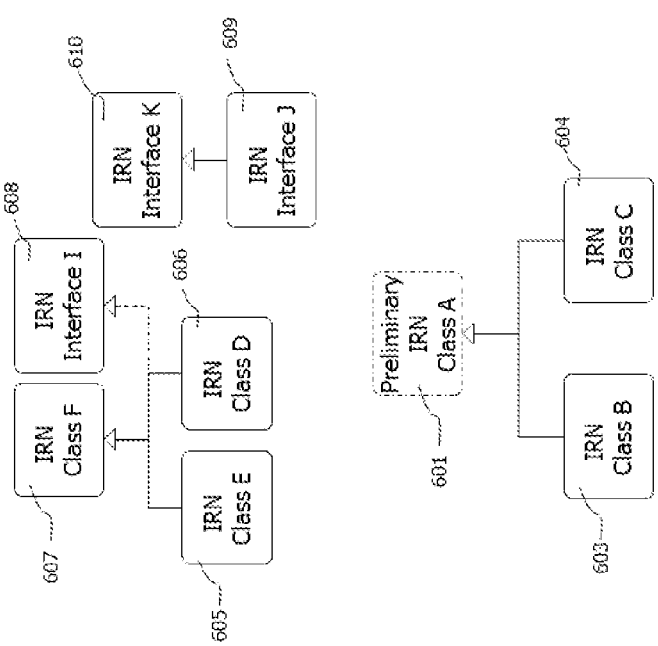
FIG 6: Exemplary Inheritance Repository

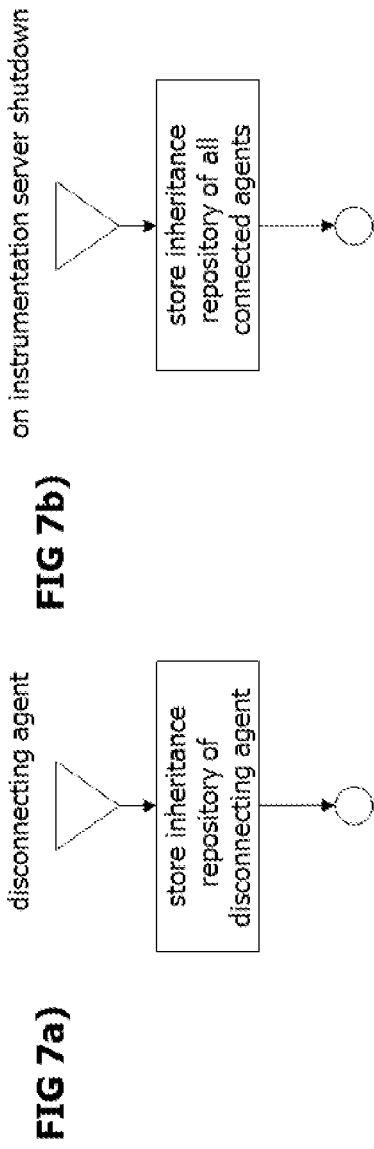

FIG 8: Evaluation of Instrumentation Rules

| Type | concrete | generic | |
|---|---|---|---|
| Direction | - | downward | upward |
| Sample class diagram | Z / +M1() | <<interface>> A / +M1()   B / +M2()   Z / +M1() +M2() | Z / +M1()   X |
| Filter criteria | Z.M1 or Z.* | A.M1 or A.*, B.M2 or B.* | X.M1 or X.* |
| Instrumented method | Z.M1 | Z.M1 and Z.M2 | Z.M1 |
| Description | Method M1 of Class Z is specified explicitly. | Method M1 of class Z is specified by the implemented interface A. Method M2 of class Z is specified by its super class B. | Method M1 of class Z is specified by the inheriting class X. |

801 — concrete
802 — downward
803 — upward

FIG 9: Place Instrumentation in Original Bytecode

FIG 10: Inheritance Repository Node (IRN) with Essential Flag
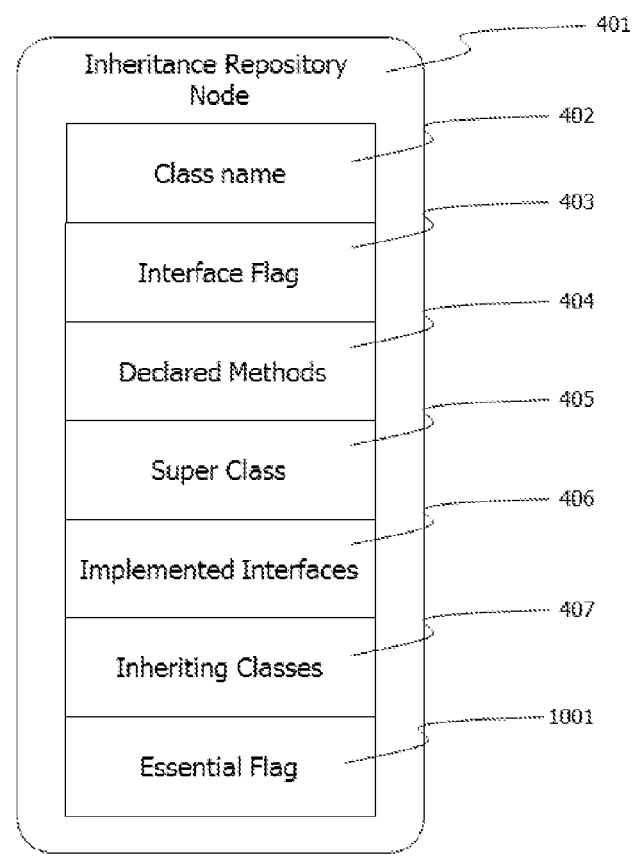

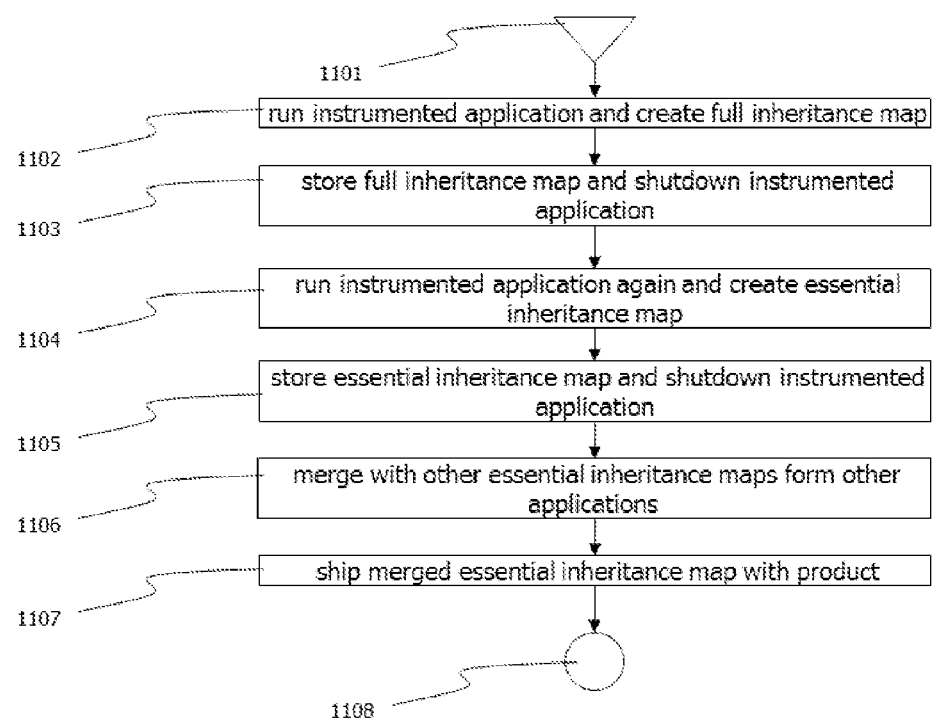

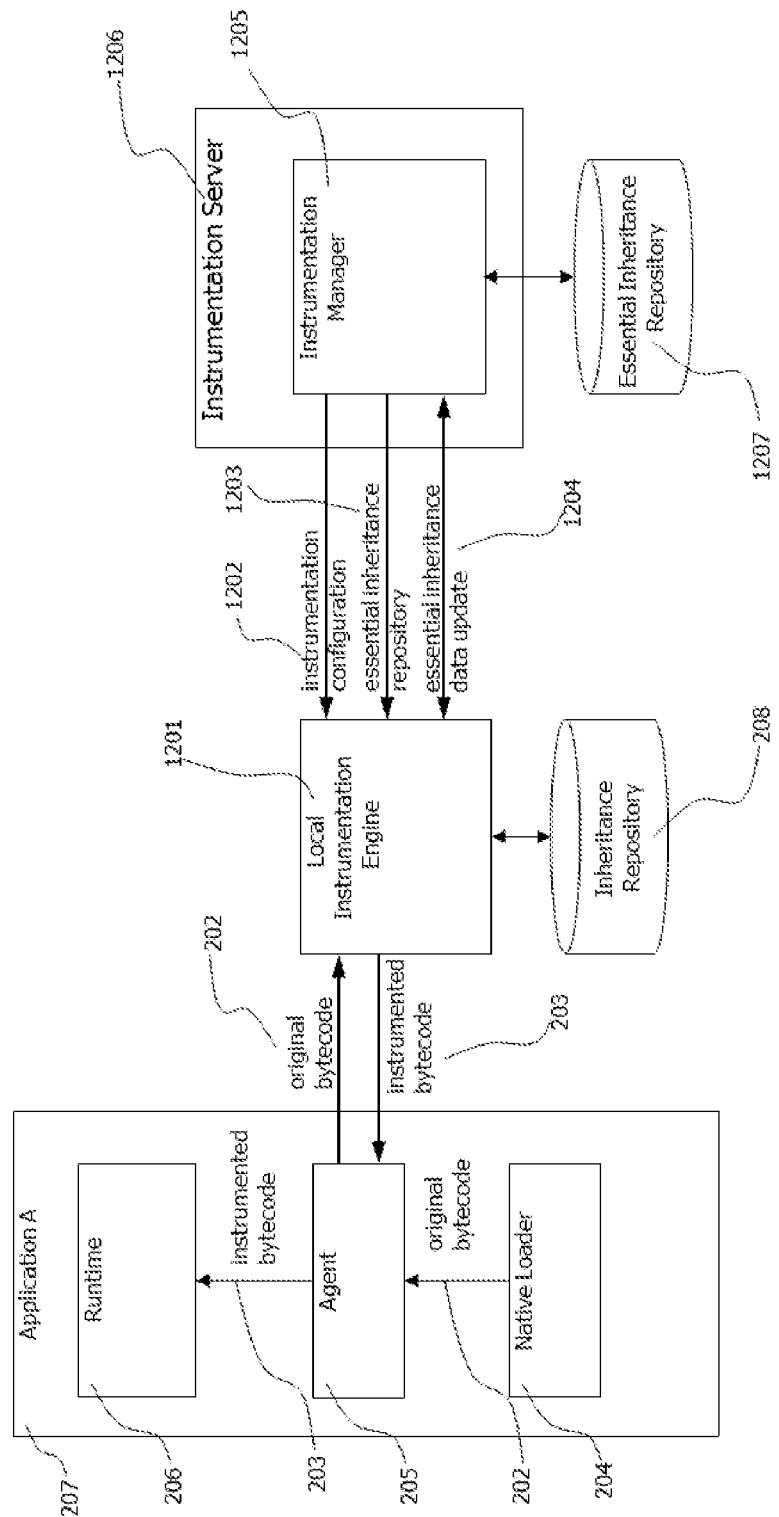
FIG 12: Distributed Instrumentation

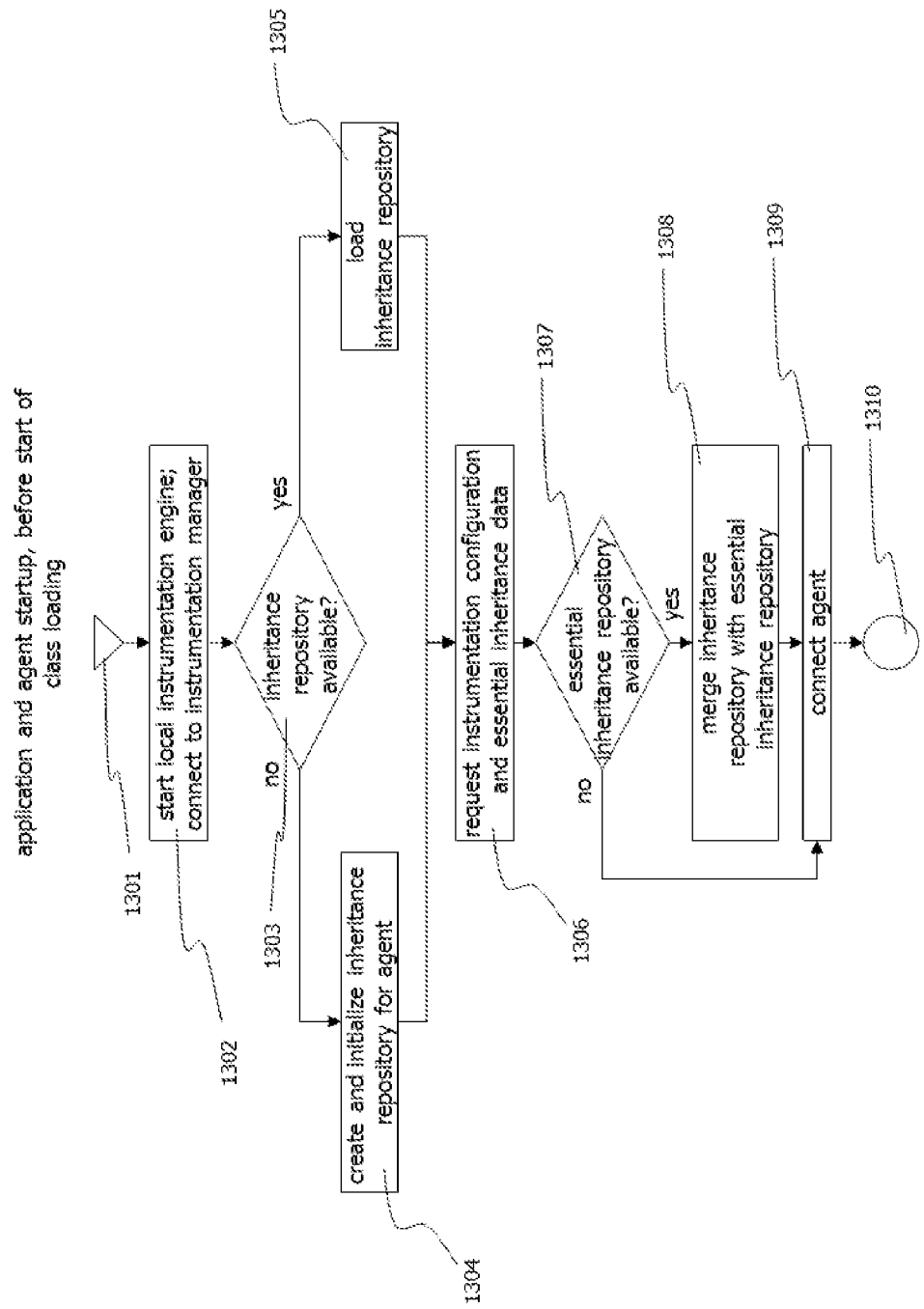

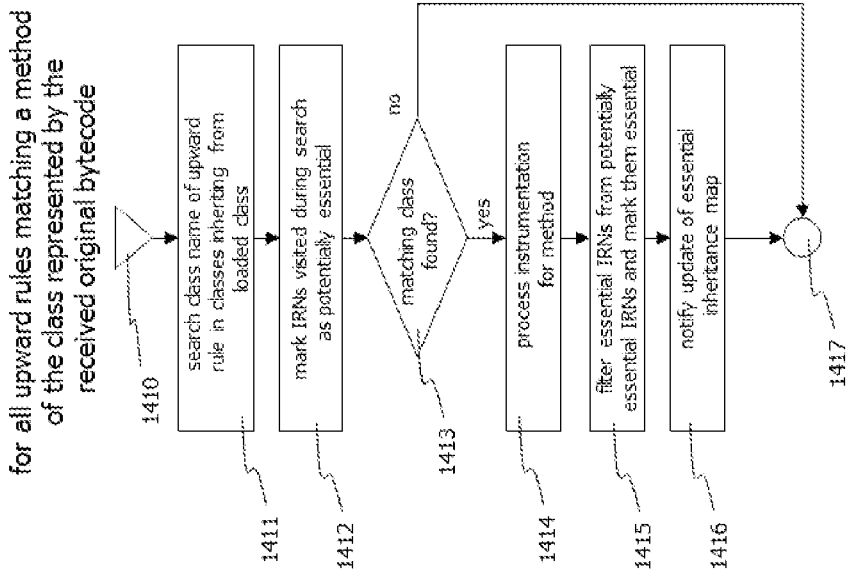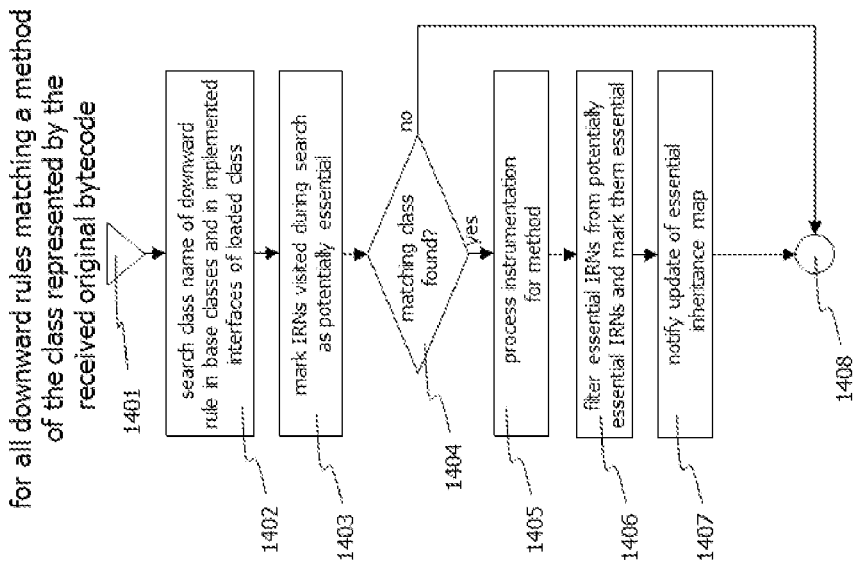

FIG 15: Storage and Update of Inheritance Repositories
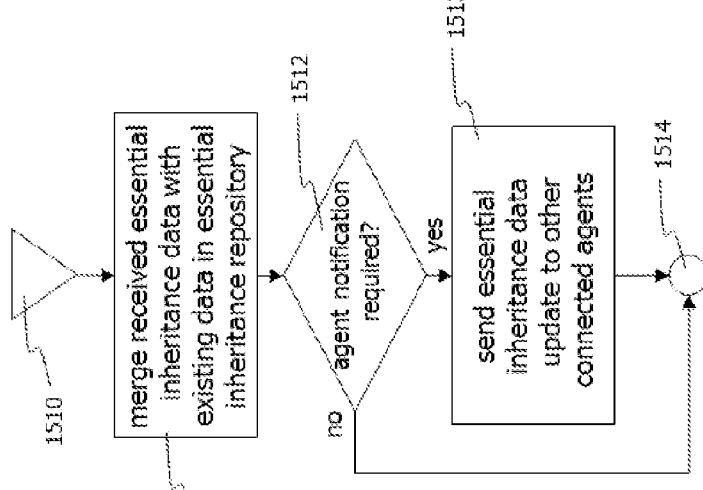
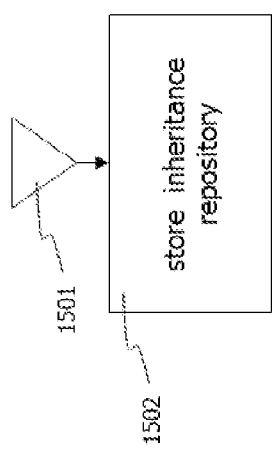
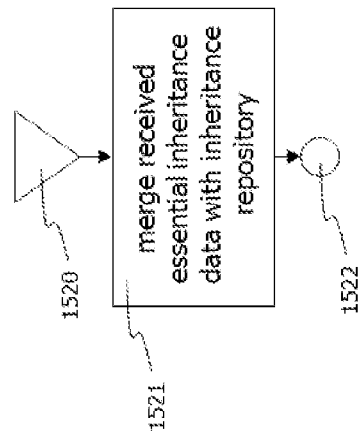

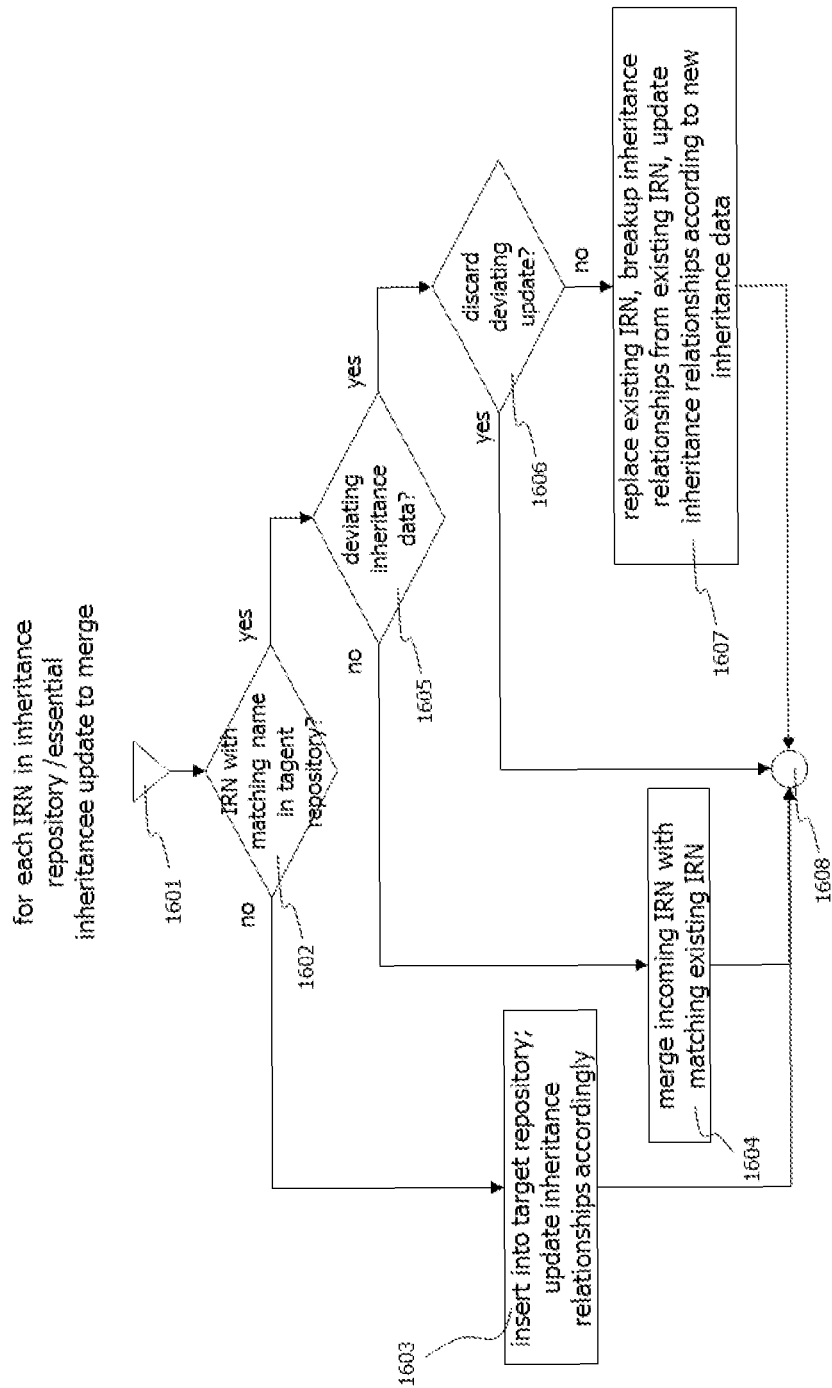

SYSTEM AND METHOD FOR EXTRACTING INSTRUMENTATION RELEVANT INHERITANCE RELATIONSHIPS FOR A DISTRIBUTED, INHERITANCE RULE BASED INSTRUMENTATION SYSTEM

CROSS-REFERENCE TO RELATED APPLICATIONS

This application is a continuation-in-part of U.S. patent application Ser. No. 11/744,876 filed on May 6, 2007. The entire disclosure of the above application is incorporated herein by reference.

FIELD

The present disclosure relates to techniques for generating an inheritance repository for use in performance monitoring across application platforms.

BACKGROUND

An increased number of features demanded from applications and shorter development cycles, increases complexity of applications and dependency on $3^{rd}$ party components and libraries. Further, new programming approaches like aspect oriented programming (AOP), which helps mastering source code complexity and thus increase productivity of software development, increase the run-time complexity of applications by adding or altering classes or methods of the application during run-time.

Bytecode instrumentation based monitoring and diagnosis systems must provide adaptive, flexible instrumentation placement tools to enable application monitoring in such complex and dynamic environments. Such instrumentation placement tools must enable instrumentation placement and modification at class load-time or during run-time. Run-time changes of the application code base or $3^{rd}$ party libraries and components must be managed by the placement tool, e.g. by adding new instrumentation code on-the-fly. The instrumentation tool must cope with different class loading mechanisms, including classes loading from network resources.

Further, generic instrumentation placement is required, enabling the instrumentation of top-level component interfaces like e.g. the JDBC driver interfaces, regardless of the concrete implementation of the component. The placement tool should be able to instrument any bytecode based application, regardless of the application type (e.g. J2EE, standalone or applet) or underlying bytecode based system (e.g. Sun Microsystem's Java or Microsoft's .NET).

Finally, an instrumentation placement tool must not interfere with behavior or functionality of the application by e.g. changing the class load order.

This section provides background information related to the present disclosure which is not necessarily prior art.

SUMMARY

The present disclosure is dedicated to a system and method for adaptive, generic bytecode instrumentation for performance monitoring and failure diagnosis tools using load-time or run-time bytecode instrumentation. Information concerning object-oriented inheritance structures is used to determine methods that are target for instrumentation. A mapping of said inheritance structures is stored in an inheritance repository.

The present disclosure requires neither source code modifications of monitored source code nor access to the source code to instrument bytecode based software applications. The code of monitored applications is instrumented on the fly, during application run-time, during or after loading class bytecode.

The present disclosure provides generic, rule based instrumentation filters to select methods of the application for instrumentation. The rule based instrumentation filters use inheritance information for method selection.

Said inheritance information is generated during application run-time and dynamically adapted to changes of configuration or bytecode of the monitored application.

The generic filter mechanism enables placement rules that refer to well known, standardized high level component interfaces. The concrete code that implements the functionality of those components is identified and instrumented at run-time.

Capturing of inheritance information and placement of instrumentation code has no impact on class loading order.

An agent is injected into the process of a monitored application during startup. The agent initializes a communication link with an instrumentation server and intercepts class load events. The bytecode of loaded classes is sent to the instrumentation server for instrumentation. Additionally, instrumentation code can be injected to already loaded classes by sending corresponding bytecode to the instrumentation server and replacing original bytecode with instrumented bytecode in the runtime environment.

The instrumentation engine uses meta-data embedded in the received bytecode, like name of the class, direct base class and directly implemented interfaces to incrementally build the inheritance repository that mirrors the inheritance structure of the monitored application. The inheritance repository reveals also indirect class relationships like inheritance relations that span multiple levels.

After the inheritance repository is updated with the meta-data of the received bytecode, the instrumentation engine uses the inheritance repository to evaluate instrumentation filter rules to filter methods for instrumentation.

The instrumentation engine adds instrumentation code to the code of the filtered methods and sends the altered bytecode back to the agent. The agent forwards the received bytecode to the run-time system which loads the altered bytecode into memory.

Another aspect of the disclosed method and system relates to the detection and usage of those parts of recorded inheritance relationships which are relevant for the instrumentation process.

An inheritance relationship is relevant for the instrumentation process, if the existence of the inheritance relationship influenced the resulting set of instrumented classes. As an example, in an instrumentation configuration consisting in only one instrumentation rule for the instrumentation of classes derived from a class A, then all inheritance relationships describing classes derived from class A are relevant for instrumentation, because those inheritance relationships influence the instrumentation process. All other classes, like the classes from which A is derived, classes derived from sibling classes of A etc. are not relevant for instrumentation.

In case of multiple instrumentation rules, the relevant inheritance relationships of all instrumentation rules may be joined to form a complete set of relevant inheritance relationships. Relevant inheritance relationships are herein also referred as essential inheritance relationships. The relevant inheritance relationships typically are only a small fraction of the whole inheritance relationships of an application, which drastically reduces the size of the relevant inheritance relationships compared to the complete inheritance relationships. This reduced size allows various applications of the relevant inheritance relationships, like e.g. creating such relevant inheritance relationships in advance and ship them as part of the monitoring system or using the relevant inheritance relationships to transfer inheritance relationship data between distributed local instrumentation engines controlled by a centralized instrumentation controlling entity, as e.g. described in U.S. Pat. No. US13/455,764.

Detecting and extracting such relevant inheritance relationships may e.g. be used to provide relevant inheritance relationships for instrumentation of standard libraries, like JDBC libraries in advance. Vendors of such standard libraries have to adhere to fixed, standardized programming interfaces, which qualifies the classes and interfaces forming those programming interfaces as ideal candidates for inheritance based instrumentation rules. Vendors typically derive from those standardized classes and interfaces and provide their specific implementations of the library functionality, which is then available via the standardized interfaces.

Thus, inheritance based instrumentation rules for those standardized classes and interfaces allow an vendor and implementation independent instrumentation of such libraries. However, variations of class loading sequence of classes with inheritance relationship may require to perform a first "adaptation" or "discovery" run of the monitored application which is used by the monitoring system to detect and store the inheritance structure of the monitored application. Subsequent runs of the monitored application then use this stored inheritance structure for correct instrumentation.

With relevant inheritance relationship data already available at the first application run, instrumentation would be correct at the first start of the application with installed monitoring system, and no additional restart would be required.

The detected and extracted relevant inheritance relationships may also be used to improve a distributed and centrally controlled instrumentation process, as described in U.S. Pat. No. US13/455,764. The described instrumentation system consists in a central instrumentation controller and a set of agents with an agent-local instrumentation engines. The instrumentation controller sends instrumentation control data, like instrumentation rules and sensor byte code to the agent-local instrumentation engines. Based on this instrumentation control data, the agent-local instrumentation engines autonomously decide which parts of the monitored application should be instrumented. In case of inheritance based instrumentation rules, as described herein, each agent-local instrumentation engine has to maintain its own inheritance repository to evaluate those inheritance based rules to decide if loaded classes should be instrumented or not. The relative small size of detected and extracted relevant inheritance relationship data allows it to send it via a computer network, e.g. from an agent-local instrumentation engine which extracted it to the instrumentation controller, and from the instrumentation controller to other agent-local instrumentation engines. This allows agent-local instrumentation engines to exchange inheritance information to enhance the accuracy of the instrumentation process.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 illustrates, conceptually, how an instrumentation program may preferably use instrumentation meta-information and class inheritance-information to evaluate filter rules to determine methods that need to be augmented with instrumentation operations.

FIG. 2 illustrates, conceptually, a preferable embodiment for instrumenting the original bytecode at load-time or during run-time.

FIG. 3 provides a flowchart for the process of initializing or loading an inheritance repository on agent registration.

FIG. 4 depicts conceptually, an inheritance repository node that may be created for each class or interface received in bytecode format.

FIG. 5 provides a flowchart for the process of building and updating an inheritance repository according to class inheritance information extracted from received bytecode.

FIG. 6A depicts the state of an exemplary inheritance structure stored within the inheritance repository before a specific class is loaded.

FIG. 6B shows the state of the exemplary inheritance structure after the specific class is loaded.

FIG. 7A provides a flowchart describing the process of storing the inheritance repository of a disconnecting agent.

FIG. 7B shows the process of saving inheritance repositories of connected agents on shutting down the instrumentation server.

FIG. 8 provides a tabular overview of selected instrumentation rule types enabled by the present disclosure.

Figure 9A:
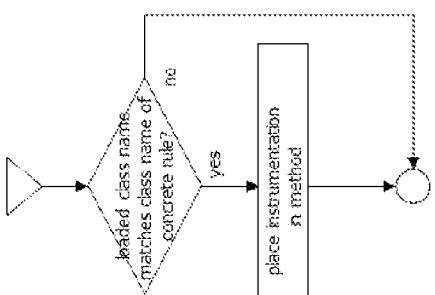

FIG. 9A shows a flowchart describing the evaluation of concrete instrumentation rules on received class bytecode.

Figure 9B:
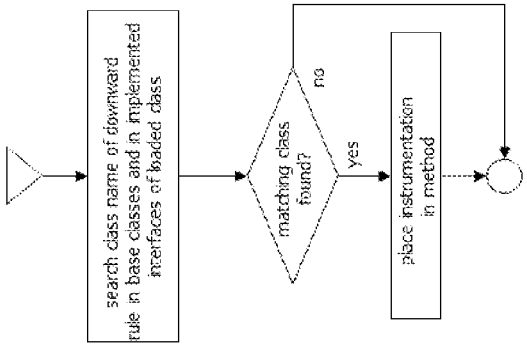

FIG. 9B illustrates the process of evaluating generic downward rules on received class bytecode.

Figure 9C:
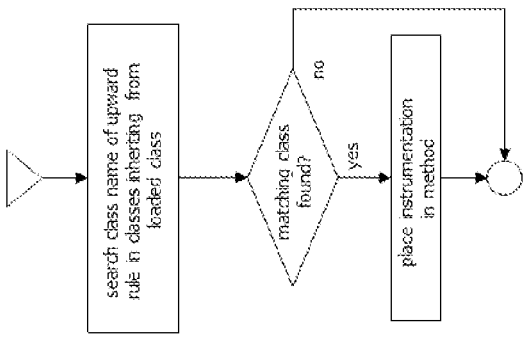

FIG. 9C provides a flowchart describing the evaluation of generic upward rules on received class byte code.

FIG. 10 shows an improved inheritance repository node, introducing an essential flag which may be used mark inheritance repository nodes as essential.

FIG. 11 describes the process of building a combined essential inheritance map which may be shipped as part of the monitoring system.

FIG. 12 shows an overview of a distributed instrumentation system which uses essential inheritance information to enhance the distributed instrumentation process.

FIG. 13 describes the process of initializing a local instrumentation engine of an agent deployed to a monitored application.

FIG. 14A shows the process of evaluating generic downward rules, enhanced by the detection and marking of essential inheritance repository nodes.

FIG. 14B shows the process of evaluating generic upward rules, enhanced by the detection and marking of essential inheritance repository nodes.

FIG. 15A shows processing triggered by the shutdown of an agent-local instrumentation engine.

FIG. 15B shows the processing of received essential inheritance map data by the instrumentation manager.

FIG. 15C shows the processing of received essential inheritance map data by an agent-local instrumentation engine.

FIG. 16 shows the process of merging incoming inheritance data with existing inheritance data.

DETAILED DESCRIPTION

Bytecode based software platforms like Sun Microsystem's Java or Microsoft's .NET framework provide interfaces to intercept bytecode loading events and to alter the bytecode of the loaded class before it is loaded into memory. Additionally those frameworks enable restricted altering of bytecode that is already loaded into the runtime environment.

Open and documented bytecode formats enable analysis of class byte code and selective altering of methods. Meta-data contained in the loaded bytecode enables retrieval of the class name, package or namespace membership, name and signature of implemented methods, direct base class, direct implemented interfaces, etc. The isolated meta-data of a class only reveals direct relationships to other classes, which is not sufficient to provide rule-based adaptive method filtering.

The present disclosure discloses a method to incrementally aggregate isolated class meta-data into a repository that mirrors also indirect relationships between classes and interfaces. This inheritance repository is in turn used to evaluate method filtering rules to detect methods for instrumentation.

FIG. 1 shows an exemplary method and system for configuring an instrumentation engine 101, using instrumentation meta-information in the form of instrumentation rules 102, instrumentation operations 104 and, run-time generated application meta-information stored in an inheritance repository 103.

Instrumentation rules may either be concrete or generic. Parameters of concrete rules contain but are not limited to a class name and a method name. Both names may either be concrete names matching to a specific method of a specific class, or name patterns that match a set of methods and/or a set of classes.

Generic rules additionally contain an indicator that specifies how inheritance relationships should be used for rule evaluation.

The inheritance repository 103 contains run-time created information about class inheritance and interface implementation. Said repository is also adapted to changes of inheritance relations during run-time. The inheritance repository is used to parametrize generic rules which are evaluated during application run-time.

The instrumentation operations 104 define the functionality that is injected into instrumented methods. The instrumentation operations preferably comprise bytecode targeted to the application platform. A separate mapping is maintained that associates instrumentation rules with instrumentation operations to enable rule specific instrumentation.

FIG. 2 displays an exemplary embodiment of the present disclosure which separates agent 205 and instrumentation engine 101 to different hosts, using a network connection for communication and for exchanging bytecode. The present disclosure is not restricted to such a configuration. Instrumentation engine and instrumented application can be deployed to the same host, using inter-process communication to exchange messages and bytecode, or agent and instrumentation engine may run within the same process.

An agent 205 is injected into the process of the application during application start and establishes a communication link to the instrumentation server 201. The instrumentation server 201 can handle multiple connected agents simultaneously.

Instrumenting a software application 207 at load time comprises the following steps: intercepting the native class loader 204 using an agent 205; capturing the original bytecode 202 and transferring said original bytecode to an instrumentation engine 101; updating inheritance repository 103 shown in FIG. 1 with meta-data extracted from original bytecode 202; evaluating instrumentation rules 102 by using the inheritance repository 103 to filter methods, and instrumenting bytecode of filtered methods; returning the instrumented bytecode 203 to the agent 205, which in turn forwards the instrumented bytecode 203 to the application run-time 206 instead of the original bytecode 202.

Alternatively, a software application can be instrumented at run-time which allows altering the set of deployed instrumentations during run-time, without the need for an application restart. Instrumenting a software application 207 at run-time comprises the following steps: original bytecode 202 is fetched either by the agent 205 from the application run-time 206, or retrieved from a bytecode cache of the instrumentation server 201; in case of bytecode fetched from the application run-time, the inheritance repository 103 is updated with meta-data extracted from original bytecode 202; evaluating instrumentation rules 102 and instrument original bytecode 202; returning instrumented bytecode 203 to the agent 205, which replaces the original bytecode 202 of the application run-time 206 by the instrumented bytecode 203.

Referring to FIG. 3, a new inheritance repository 103 is created, initialized and assigned to an agent 205 that registers at instrumentation server 101 for the first time. For subsequent registrations, the inheritance repository 103 assigned to the agent is loaded. After the inheritance repository 103 for the agent 205 is loaded, the agent establishes a connection to the instrumentation engine 101.

FIG. 4 depicts the preferred embodiment of an inheritance repository node (IRN) 401, which is used to represent classes or interfaces within the inheritance repository. It contains meta-information representing a class or interface received from the agent 205, and references to other IRNs which map inheritance or interface implementation relationships. An IRN contains the class name 402 of the represented class or interface, a flag indicating if the IRN describes an interface or a class 403, and a list of declared methods 404 containing method related meta-information like method name and signature.

The field super class 405 references to the IRN representing the direct super class or super interface of the described class or interface and the field implemented interfaces 406 contains a list of references to IRNs representing interfaces directly implemented by the class described by the IRN. Classes that directly extend the described class are identified by the field inheriting classes 407, which contains a list of references to IRNs representing the classes directly extending the described class. IRNs and references between IRNs build a graph that enables queries for direct and indirect inheritance and interface implementation relations between classes.

FIG. 5 illustrates the process of building and updating the inheritance repository according to meta-information extracted from original bytecode 202 received from the agent 205. In a first step, meta-information like class or interface name, direct super class name and names of directly implemented interfaces are extracted from the received original bytecode 202. The extracted class or interface name is used to query the inheritance repository 103 for an existing IRN 401 that represents the received class. If a matching IRN is found, the meta-information of the IRN 401 is updated with the meta-information extracted from received original bytecode 202. Otherwise, a new IRN 401 is initialized with meta-information from original bytecode 202 and added to the inheritance repository 103. The inheritance repository is queried for IRNs representing the direct super class and the directly implemented interfaces extracted from original bytecode 202, and new IRNs are created for classes and interfaces that are not represented within the inheritance repository. Those IRNs are partially initialized by setting the class name 402 and the interface flag 403 with the meta-information extracted from original bytecode 202. The remaining part of the IRNs is initialized when bytecode of the represented class is loaded. Further, the IRN 401 representing the super class of the received class or interface is updated by adding a reference to the IRN representing the received original bytecode 202 to the list of inheriting classes 407.

In a subsequent step, the fields super class 405 and implemented interfaces 406 of the IRN 401 representing the received original bytecode 202 are initialized with references to the IRNs representing the direct super class and the directly implemented interfaces of the class represented by the received original bytecode 202.

The process depicted in FIG. 5 incrementally builds a graph that maps global inheritance and interface implementation relationships of all classes and interfaces received from the agent 205.

FIG. 6 exemplary illustrates the process of updating an inheritance repository 103. FIG. 6A shows the state of the inheritance repository before inserting meta-data extracted from received original bytecode of class A. FIG. 6B shows the state of the inheritance repository after the IRN representing class A was added to the repository. Prior to inserting meta-information of class A, the inheritance repository contains separated IRN 401 graphs, describing parts of the inheritance structure. One sub graph maps inheritance relationship from class F 607 to class E 605 and class D 606, and the interface implementation relationship from class D 606 to interface 1608. Another graph maps the inheritance relationship between the interfaces K 610 and J 609. A third graph contains IRNs for the classes B 603 and C 604 and a preliminary IRN of class A 601. The preliminary IRN of class A 601 contains meta-information concerning class A that was extracted from original bytecode 202 of classes B and C, indicating a common super class A.

On receiving original bytecode 202 representing class A, the preliminary IRN of class A 601 is updated with extracted meta-information to the final IRN of class A 602. Meta-information extracted from original bytecode 202 representing class A reveals an inheritance relationship between class D and class A and an interface implementation relationship between class A and interface J. The inheritance repository 103 is updated to map these additional identified relationships, which fills the gap within the inheritance repository 103 and connects the separated graphs.

FIG. 7 describes storage of inheritance repositories 103 by a preferred embodiment using a separate instrumentation server 201 handling multiple agent connections. As depicted in FIG. 7A, the inheritance repository associated with a specific agent 205 is stored if the agent is disconnected. As depicted in FIG. 7B, inheritance repositories of all connected agents are stored on shutdown of the instrumentation server 201. The stored inheritance repositories are used on subsequent agent connections (cf. FIG. 3).

The preferred embodiment evaluates instrumentation rules 102 against the name of the class or interface and the method names extracted from received original bytecode 202, to filter methods for instrumentation. Instrumentation rules are grouped into concrete and generic rules. Concrete instrumentation rules provide filter criteria for class name and a method name which are matched against class name and method names extracted from original bytecode 202. Both class and method filter criteria may be search patterns that match to multiple extracted class or method names. Additional filter criteria, like method arguments and method modifiers may also be used for filtering.

Generic rules additionally take inheritance relationships into account. The class name filter criterion is used to query the inheritance repository 103 for classes or interfaces with specific inheritance relationships. Generic instrumentation rules enable instrumentation of method declarations without executable code, like methods declared in interfaces or abstract methods. The classes implementing those methods are determined and instrumented at run-time.

The preferred embodiment provides two different types of generic rules, called downward rules and upward rules. Downward rules are scanning for classes that directly or indirectly inherit from classes, or directly or indirectly implement interfaces matching the class filter criterion. Upward rules are scanning for classes and interfaces that are direct or indirect super classes of the classes matching the class filter criterion.

Downward rules enable instrumentation in an application independent way. For instance, downward rules can be used to instrument any JDBC driver, regardless of the internal implementation of the driver.

Upward rules are used to instrument methods inherited but not overwritten by classes matching the class selection criteria. The information of the inheritance repository 103 enables various other types of generic instrumentation rules, like rules filtering only methods that implement interfaces, or rules filtering methods called by a specific method.

FIG. 8 exemplary shows the evaluation of concrete, upward, and downward rules. Column 801 shows the filtering of method M1 of class Z using a concrete instrumentation rule with a class filter criterion "Z" and method filter criterion "M1" or "*", a wildcard matching any method name and thus selecting any method of class Z.

Generic downward filtering rules are demonstrated in column 802. Class Z implements interface A, which declares M1. In turn, class Z implements method M1 to fulfill the contract of interface A. A downward rule specified for interface A, selecting declared method M1 or all declared methods implicitly filters M1 of Z by evaluating the interface implementation relationship between Z and A. Additionally, class Z extends class B and overwrites the method M2 declared by class B. A downward rule specified for class B, selecting method M2, or a downward rule selecting all methods of class B implicitly filters method M2 of class Z by evaluating the inheritance relationship between class Z and B.

Column 803 illustrates the evaluation of a generic upward rule. Class X extends class Z, and is not overwriting method M1. An upward rule defined for the method M1 or all methods of class X selects method M1 of class Z by searching the nearest super class of X implementing the method M1.

Referring to FIG. 9, instrumenting received original bytecode 202 during load-time or run-time is performed by evaluating instrumentation rules to filter methods for instrumentation. FIG. 9A depicts the evaluation of concrete instrumentation rules. Meta-information previously extracted from original byte code 205, like class name and method names is used by the instrumentation engine 101 to evaluate instrumentation rules 103. To determine if a method is selected by one or more concrete instrumentation rules the instrumentation engine 101 first selects all concrete instrumentation rules matching the extracted method name. In a second step, the extracted class name is matched with the class selection criterion of the instrumentation rules selected in the previous step. Instrumentation operations 104 associated with concrete instrumentation rules that passed both matching steps are inserted into the received original bytecode 202.

The process of evaluating downward rules for a method name extracted from received original bytecode 202 is shown in FIG. 9B. First, all downward rules matching the extracted method name are selected. Then, the inheritance repository 103 is queried to determine if the class selection criterion of the selected rules match to the name of a direct or indirect super class or an directly or indirectly implemented interface of the class represented by the received original bytecode 202. Rules with matching class names are selected, and instrumentation operations 104 associated with those rules are inserted into the received original bytecode 202.

FIG. 9C shows the process of evaluating upward rules on a method name extracted from received original bytecode 202. After selecting all upward rules matching the extracted method name, the inheritance repository 103 is queried for the classes inheriting from the class represented by the received bytecode that match the class selection criterion of the selected rules. Upward rules with class names that match one of the inheriting class names are selected and instrumentation operations 104 associated with those rules are inserted into received original bytecode 202. The processes described in FIG. 9A to 9C are executed for each method name extracted from received original bytecode 202 to generate the instrumented bytecode 203.

FIG. 10 conceptually describes an inheritance repository node (IRN) which may be used by an enhanced instrumentation system that identifies and extracts relevant inheritance data. It may in addition to an IRN as described in FIG. 4, contain an essential flag 1001, which may be used to mark those IRNs which are relevant for the instrumentation process. This flag may e.g. be set for all IRNs that had an impact on the instrumentation process and may not be set for all other IRNs.

The process of creating a combined set of relevant inheritance information created out of individual sets of relevant inheritance information extracted from the instrumentation of typical variants of application configurations is described in FIG. 11. This may e.g. include different brands and versions of virtual machines and application servers used to run applications or different brands and versions of libraries used e.g. for database access or for communication. Test applications may be run using those various environments. Those test applications may be instrumented using a set of generic instrumentation rules, directed to instrument standardized application interfaces, like e.g. standardized database interfaces, component access interfaces or communication interfaces. Examples for libraries using such standardized interfaces for the Oracle Java™ platform would be JDBC for database access, EJB for component access or JMS for messaging. After the instrumented runs of those test applications, the generated relevant inheritance information of all runs are merged into one comprehensive relevant inheritance information repository, which may then be shipped as part of the monitoring system to improve the instrumentation process of monitored customer applications.

The process may start with step 1101, when a new generic instrumentation configuration, consisting in a set of instrumentation rules is created. This may e.g. be caused by a reengineered and enhanced instrumentation rule set that provides better instrumentation results for a new version of a performance monitoring product. In an initial step 1102, the aforementioned test applications using various environments are run instrumented to create full inheritance information for each of those environments. In subsequent step 1103, the test applications are shut down and full inheritance information for each environment is stored. In following step 1104, the test applications are executed again and instrumented using the previously created full inheritance data. The second run creates completely instrumented applications, and also complete sets of relevant inheritance data are created. In the next step 1105, the test applications are shut down and the created and extracted relevant inheritance data is stored for each application run. Afterwards, the individual sets of relevant inheritance data are merged into one combined relevant inheritance data repository in step 1106. Afterwards the combined relevant inheritance data repository may be packaged and shipped with a new version of the performance monitoring system together with the generic instrumentation configuration used to create the relevant inheritance data in step 1107. The process then ends with step 1107. It is noteworthy that the above described process may also be performed if e.g. new version of virtual machines, application servers, or libraries are available, to create an updated combined relevant inheritance data repository, which may be separately distributed as update of an existing version of a performance monitoring system.

FIG. 12 shows a distributed instrumentation system consisting in a central instrumentation server 1206 containing an instrumentation manager 1205. The instrumentation manager maintains an essential inheritance repository 1207. The distribute instrumentation system may be part of an instrumentation based performance monitoring system and the essential inheritance repository 1207 may initially contain combined relevant inheritance date as created in the process described in FIG. 11. The instrumentation system may be used to instrument and monitor multiple applications, like e.g. application A 207. An agent 205 may be deployed to each monitored application. The agent 205 may start a local instrumentation engine 1201, which communicates with the central instrumentation manager 1205. The local instrumentation engine may receive the content of the essential inheritance repository 1207 from the instrumentation manager 1205 at an initial connection between the local instrumentation engine 1201 and the instrumentation manager. Additionally, it may receive instrumentation configuration 1202 in form of sensor bytecode and instrumentation rules from the instrumentation manager. Additionally, it may exchange updates of relevant inheritance information 1204 with the instrumentation manager. During execution of the monitored application 207, the native loader 204 of the virtual machine running the application loads original bytecode 202. The agent 205 intercepts the loading of the original bytecode and forwards it to its local instrumentation engine 1201. The local instrumentation engine 1201 receives the original bytecode, extracts metadata, like class name, method names etc. from it and uses this meta-data together with inheritance data stored in the inheritance repository 208 to determine if and how the received bytecode should be instrumented. The extracted meta-data may be used to update the inheritance repository 208 in case the inheritance repository does not yet contain data describing the currently processed original bytecode. If the local instrumentation engine 1201 determines that the received original bytecode 202 should be instrumented, an update of relevant inheritance information may be calculated and sent to the instrumentation manager 1205 in form of an essential inheritance data update 1204. The instrumentation manager 1205 may merge the inheritance data received with the essential inheritance data update 1204 with the inheritance data stored in the essential inheritance repository. Additionally, the instrumentation manager 1205 may forward the essential inheritance data update 1204 to other connected local instrumentation engines 1201. For details of this processes, please see FIGS. 14 to 16. This broadcasting of inheritance data updates allows the distributed local instrumentation engines to maintain a shared inheritance data repository.

After the local instrumentation engine performed the desired instrumentations to create instrumented bytecode 203 out of the original bytecode 202, the instrumented bytecode 203 is forwarded to the agent 205 which in turn forwards the instrumented bytecode to the runtime module 206 of the virtual machine, where it is loaded and used instead of the original bytecode 202. In case the local instrumentation engine 1201 determines that the original bytecode 202 should not be instrumented, the unchanged original bytecode 202 is returned to the agent 205 and loaded by the runtime module 206.

The exchange of inheritance information between different local instrumentation engines 1201 allows combining a localized and parallel instrumentation process providing the advantages described in U.S. Pat. No. US13/455,764 with an inheritance rule based instrumentation system.

As an example, in a clustered environment, where a set of identical applications run in parallel to improve the performance of the overall system, the instrumentation process may be improved as followed. To deploy the agent to the applications in the cluster, each of the application is shut down. Afterwards, one of the applications is restarted and run to create full inheritance information in the inheritance repository 208 of the local instrumentation engine. Then, this application is restarted again, and the local instrumentation engine performs a complete instrumentation using the now available full inheritance information, extracts the relevant inheritance information and sends it to the instrumentation manager 1205, which stores it in the essential inheritance repository 1207. Afterwards, the other applications of the cluster are started, the local instrumentation engines 1201 of those applications are started and receive the updated relevant inheritance information stored in the essential inheritance repository from the instrumentation manager 1205. With this updated inheritance information, the other local instrumentation engines are able to perform a complete instrumentation of the application bytecode at the first start, without another restart. It is noteworthy that the above described procedure is only necessary if application specific instrumentation rules exist in the instrumentation configuration which divert from the standard instrumentation configuration shipped with the monitoring, because the initial content of the essential inheritance repository 1207 already contains sufficient inheritance information for a complete and correct instrumentation.

Another, more narrow-toothed interaction between different local instrumentation engines that improves the instrumentation process is explained by an example that uses the inheritance structure described in FIG. 6B. Consider a class loading sequence of D, C, A and B and an instrumentation rule for instrumenting class D and classes derived from class D. A first local instrumentation engine, with an empty inheritance repository 208 and deployed to a first instance of the monitored application, would instrument class D, because it directly matches the instrumentation rule. It would not instrument C, because the indirect inheritance relationship between C and D is not yet known. The afterwards loaded class A is instrumented, because the direct inheritance relationship between class A and D can be determined without stored inheritance information in the inheritance repository 208. It is noteworthy, that during loading and instrumenting of classes, inheritance repository updates and essential inheritance data updates will be performed in parallel. On loading of class D, C and A, the inheritance repository will be updated to reflect those loaded classes and their inheritance relationship. On loading and instrumentation of classes D and A, also essential inheritance data updates will be sent to the instrumentation manager 1205, which broadcasts those updates to other connected local instrumentation engines 1201. Loading of class B also causes an update of the inheritance repository and, because class B is instrumented, also sending of an essential inheritance data update.

If a second instance of the monitored application is running in parallel but slightly delayed to the first application instance, the instrumentation process may be performed as followed. First, the second application instance loads class D, which is instrumented, then the local instrumentation engine 1201 of the second application receives the essential inheritance data update from the instrumentation manager containing inheritance information about classes D and A, which is stored in the inheritance repository 208 of the second application. Then, classes C, A and B are loaded by the second application instance, which are now all instrumented due to the inheritance information update received from the first application.

The process depicted in FIG. 13 describes the startup and initialization of a local instrumentation engine 1201. The process starts with step 1301, when the application 207 is started, which triggers loading and starting of the agent 205 deployed to the application, which in turn launches the local instrumentation engine 1201 of the agent 205, in step 1302. Afterwards, the local instrumentation engine 1201 checks if an inheritance repository 208 is available in step 1303. In case no inheritance repository 208 is available, a new one is created in step 1304. Otherwise, the existing inheritance repository 208 is loaded in step 1305. In both cases, the process afterwards continues with step 1306, which creates a connection to the instrumentation manager 1205 and requests instrumentation configuration data 1202 containing but not limited to instrumentation rules and sensor bytecode, and the relevant inheritance relationships currently stored in the essential inheritance repository 1207. Following step 1307 checks if the instrumentation manager 1205 provided relevant inheritance relationships. In this case, step 1308 merges the received relevant inheritance relationships with the inheritance relationships from the inheritance repository 208, and execution continues with step 1309. Otherwise step 1308 is skipped and the process continues with step 1309. Step 1309 connects the agent 205 with the instrumentation manager, to e.g. receive future updates of the instrumentation configuration and exchange inheritance information updates with the instrumentation manager 1205. The process then ends with step 1310.

The processes shown in FIG. 14 describe an enhanced instrumentation process which in addition to the creation of instrumented bytecode out of original bytecode as described in FIG. 9, detects and sends inheritance relationships relevant for the decision to instrument the currently processed original bytecode. The processing takes place in conjunction and after the processing described in FIG. 5, which updates the inheritance repository 208 of the local instrumentation engine 1201 during the processing of received original bytecode 202.

FIG. 14A describes the processing of downward rules for loaded original bytecode and FIG. 14B describes the processing of upward rules. Both processes are executed after the execution of the process described in FIG. 5, which extracts meta-data from the original bytecode 202, and which updates the inheritance repository to reflect the just loaded original bytecode 202. Both processes are executed for each declared method of the class described by the loaded original bytecode 202 and for each downward rule 802 (process described in FIG. 14A or each upward rule 803 (process described in FIG. 14B) with a matching method name.

Process 14A starts with step 1401 by selecting one of the downward rules matching by method name. Subsequent step 1402 searches for a class name or interface name matching the class name specified by the current downward rule in the base classes and implemented interfaces of the class described by the loaded original byte code. This may be performed by first fetching the IRN 401 identifying the current class from the inheritance repository 208, and then comparing class name 402 of the fetched IRN 401 and the class name 402 of all IRNs 401 directly and indirectly referred by the fetched IRN 401 as super class 405 or implemented interfaces 406 with the class name specified by the currently processed downward rule. This way, all currently known direct or indirect ancestor or base classes and directly or indirectly implemented interfaces of the currently loaded class are identified and accessed. Step 1402 is performed as long as either a matching base class or interface was found, or until all currently known base classes and interfaces have been verified. Additionally, step 1403 marks all IRNs visited during the search as potentially essential or relevant IRNs. This may e.g. be performed by maintaining a list of potential essential IRNs and adding each IRN inspected during the search to this list. Following step 1404 checks if a matching base class or implemented interface has been found. In case of no match, the process ends with step 1408. Otherwise, the process continues with step 1405 which performs the instrumentation of the currently processed method of the currently processed original bytecode 202. Subsequent step 1406 filters the potentially essential or relevant IRNs determined in step 1403 to identify the essential or relevant IRNs and mark them as relevant or essential by setting the essential flag 1001. This filtering process may e.g. take the inheritance or interface implementation relationships that caused the match into account and only mark those as essential.

The inheritance relationships depicted in FIG. 6B may be used to illustrate this process. A downward inheritance rule 802 named D1 specified for method M1 of class D may be available, and the byte code representing class C may have been loaded and is processed according to the process described in FIG. 14A. Class C declares a method M1, therefore D1 is selected in step 1401. Step 1402 searches the upward inheritance relationships of class C for a class or interface with name matching the class name of D1. First, the step checks class C itself, and then class A as it is the base class of C. Then it may check interfaces J and K without a match. Afterwards, it checks class D which matches and the step terminates indicating a positive match. Step 1403 would add classes C, A, D and interfaces J and K to the list of potentially essential or relevant IRNs as they all were visited during the search. The filtering performed in step 1406 would then consider that class D caused the match of D1 and strip all classes and interfaces not in the direct inheritance path between C and D from the potential essential or relevant IRNs, which would remove interfaces J and K from the list and keep classes C, A and D.

Coming back to the description of process 14A, the process continues with step 1407 which notifies new detected relevant inheritance relationships to the instrumentation manger 1205. The process then ends with step 1408. To improve the communication performance, step 1407 may be executed in a bulked way, which e.g. sends updates only after all inheritance rules of for a loaded class have been processed, or only after a specific amount of updates accumulated on the local instrumentation engine 1201.

FIG. 14B describes the processing of an upward rule for a new loaded class and starts matching a declared method of the new loaded class. Processing is performed for each declared method, for each matching upward rule. Initial step 1410 fetches a matching upward rule for a method of the new loaded class and subsequent step 1411 searches inheritance data for a class derived from the currently loaded class, e.g. using the inheriting classes filed 407 of IRNs to find a class which directly or indirectly inherits from the loaded class and which matches the class name specified in the upward rule. Step 1411 either terminates if a matching class was found, or of if all directly or indirectly derived classes have been examined. Step 1412 marks all classes visited during the search as potentially relevant. Step 1413 checks if a matching derived class was found. In case of no match, the process ends with step 1417. Otherwise, the process continues with step 1414 which may instrument the currently processed method of the currently loaded class. Subsequent step 1415 filters the potentially relevant inheritance relationships detected in step 1412 by stripping out those classes which are not in the direct inheritance line between the currently loaded class and the class that caused the rule to match and setting the essential flag 1001 of the remaining IRNs 401. Step 1416 notifies the new detected relevant inheritance relationships to the instrumentation manager 1205 and the process terminates with step 1417.

To allow a more fine grained control of the instrumentation process, new variants of upward and downward rules called "exclude rules" may be introduced. Processing of such exclude rules may be similar as described in FIG. 14A and FIG. 14B, except that the steps 1405 and 1414 do not perform instrumentation of original bytecode, but skip processing of subsequent rules and therefore also skip further instrumentation of the currently loaded class. In case instrumentation rules are prioritized and executed by the processes described in FIG. 14 according to their priority, an exclude rule with assigned highest priority could be used to exclude specific classes from instrumentation according to their inheritance relationships. Although such exclude rules do not cause the instrumentation of original bytecode 202, they influence the overall instrumentation process. Therefore the identification and notification of relevant inheritance information also applies to this rules.

The process of persistent storage of extracted inheritance data and the communication of different local instrumentation engines 1201 via the instrumentation manager is depicted in FIG. 15, whereas FIG. 15A describes the storage of the inheritance information on shutdown of a local instrumentation engine 1201, FIG. 15B describes the processing of received inheritance information by the instrumentation manager and FIG. 15C describes how a local instrumentation engine 1201 processes incoming inheritance information updates. The process described in FIG. 15A is triggered by the shutdown of a local instrumentation engine 1201. Such a shutdown may be caused by a shutdown of the monitored application 207, which triggers the shutdown of the agent 205 deployed to the application which in turn shuts down its local instrumentation engine 1201. On shutdown, the local instrumentation engine 1201 persistently stores the inheritance relationships kept and updated in memory in the instrumentation repository 208 in step 1502. Afterwards, the process terminates with step 1503.

The processing of a received inheritance data update by the instrumentation manager 1205 is described in FIG. 15B. The process starts when the instrumentation manger receives such an update in step 1510 and continues with step 1511 which merges the received inheritance data update with the inheritance data currently stored in its essential inheritance repository to create an updated essential inheritance repository also containing the received updates. For details about merging incoming inheritance data with existing inheritance data, please see FIG. 16. Afterwards, the instrumentation manager determines if it is required to notify other connected agents about the inheritance data update. Such a notification may e.g. be omitted if the inheritance data received with the update was already part of the essential inheritance repository 1207 and thus did not cause any change of the stored inheritance data. In this case, the process ends with step 1514. Otherwise, the instrumentation manager sends an inheritance data update to the agents which are currently connected, except the agent from which the inheritance data update was received in step 1513. To improve performance, the inheritance manager may strip inheritance data that has already been in the essential inheritance map 1207 before the update was received from the update notifications sent to the agents. The connected agents are already notified about the state of the essential inheritance map before the update and only require updates causing a change. The process then ends with step 1514.

The instrumentation manager 1205 may perform a persistent storage either after each processed update or on shutdown of the instrumentation sever 1206 or on both occasions.

FIG. 15C shows the processing of an incoming inheritance data update by a local instrumentation engine 1201. The local instrumentation engine merges the incoming instrumentation data with the inheritance data it is currently aware of in step 1521, according to the process described in FIG. 16. The process then ends with step 1522.

Merging of incoming inheritance data, e.g. in form of an essential inheritance data update 1204 received by a local instrumentation engine 1201 or by the instrumentation manager 1205 with existing inheritance data as e.g. available in an inheritance repository 208 or an essential inheritance repository 1207 is shown in FIG. 16. Such a merging process may also be executed during the in-house creation of an essential inheritance repository, as described in FIG. 11.

The process is triggered when new inheritance data for merging is received e.g. by an instrumentation manager or a local instrumentation engine and is executed for each IRN 401 contained in the received inheritance data. The process starts with step 1601 which fetches an IRN 401 from the received inheritance data update and continues with step 1602 which checks if the currently processed IRN 401 is already available in the target repository. This may e.g. be performed by checking if the target repository already contains an IRN 401 with matching class name 402 and interface flag 403. In case no such IRN 401 is available in the target repository, the new IRN 401 is inserted into the target repository and the target repository is updated with the new inheritance relationships introduced by the new IRN. In case the super class 405 or one or more of the implemented interfaces 406 specified by the new IRN are already known in the target repository, corresponding references are created within the target repository to represent those inheritance relationships. Such references may also be established to classes listed in the inheriting classes 407 of the new added IRN to represent those inheritance relationships. Note: in case an existing IRN which is listed as inheriting class already specifies a super class other than the one defined with the new IRN, a conflicting update was detected. The system has to decide if existing or new inheritance data has priority and if the update regarding the inheriting classes has to be applied or not. The goal of the decision should be a resulting inheritance data that best represents the inheritance structure of the monitored system. For more detailed information about such a strategy, please see description of step 1606. The process then ends with step 1608.

In case step 1602 detects that a matching IRN is already available in the target repository, the process proceeds with step 1605, which check if the new and existing IRN provide consistent inheritance information. This may e.g. be checked by comparing the super class 402 and interface flag 403 of both IRNs. In case either super class or inheritance flag deviate, a conflicting inheritance data update was detected and the process continues with step 1606. Otherwise, process continues with step 1604 which merges data from the incoming IRN with the matching existing IRN, this may e.g. contain adding declared methods received with the new IRN to the declared methods 404 of the existing IRN. The process then ends with step 1608.

In case the inheritance data of received IRN and matching IRN deviate, the process continues with step 1606, which determines if the received IRN should be discarded or if it should replace the existing IRN to resolve the conflict. Goal of a conflict resolving strategy should be inheritance data that matches the inheritance structure of the monitored application as close as possible. This goal may cause different handling of inheritance conflicts on local instrumentation engine 208 and instrumentation manager 1205. The local instrumentation engine maintains an inheritance repository 208 which contains inheritance information derived from classes loaded and used by the monitored application. Therefore, in case of a conflict, for a local instrumentation engine, the local inheritance data has priority over incoming inheritance data. The local instrumentation engine may discard the conflicting inheritance update. The essential inheritance repository 1207 maintained by the instrumentation manager 1205 may initially contain inheritance data as e.g. generated in the process described in FIG. 11. This inheritance data may be optimized for usage by a wide range of monitored applications and may lack inheritance data relevant for the currently monitored application. As a consequence, for the instrumentation manager 1205, incoming inheritance data updates may have priority over existing inheritance data in the essential inheritance repository in case of a conflict, and the instrumentation manager 1205 may replace the existing conflicting IRN 401 with the incoming IRN 401. It is noteworthy that various other conflict resolution strategies are possible and can be employed without leaving scope and spirit of the described embodiments. For instance in heterogeneous environments, deviating inheritance data may be created and sent by different local instrumentation engines, caused by e.g. the usage of different versions of a specific libraries. Those deviating inheritance data is received by the instrumentation manager 1205 and may cause repetitive inheritance conflicts at the instrumentation manager 1205. The instrumentation manager may detect such situations based on the number of conflicting updates detected for specific classes and as a reaction skip such classes when they are contained in an update.

For conflicting inheritance information discovered during the in-house creation of relevant or essential inheritance data, conflict resolution may be based on usage statistics of the classes/libraries involved in the conflict, and the conflict may be resolved by selecting the class which is used by the majority of the customers.

In case step 1606 decides to discard the incoming IRN, the process ends with step 1608. Otherwise, the process continues with step 1607, which removes the matching existing IRN 401 from the target repository, removes all inheritance relationships caused by this IRN and inserts the incoming IRN to the target repository. Afterwards, references to other existing IRNs in the target repository are create according to the inheritance relationship data of the new IRN stored in the super class field 405, the implemented interfaces field 406 and the inheriting classes field 407. The process then ends with step 1608.

For the description of process 16 the term target repository may refer to both the in memory representation of inheritance data of a local instrumentation engine 1201 or an instrumentation manager 1205 and the persistently stored instrumentation data of an inheritance repository 208 or an essential inheritance repository 1207.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for generating an inheritance repository for use in performance monitoring across application platforms, comprising:
   extracting, by an instrumentation engine, meta-data for a given class from bytecode, where the instrumentation engine is implemented by computer-readable instructions executed by a computer processor;
   evaluating, by the instrumentation engine, the given class in relation to an instrumentation rule, where the instrumentation rule specifies a criterion for classes to be instrumented and is defined in relation to at least one particular class;
   determining, by the instrumentation engine, whether the given class meets the criterion using one or more known inheritance relationships stored in a data store;
   tagging, by the instrumentation engine, a subset of the known inheritance relationships as being relevant to the instrumentation process when the given class is determined to meet the criterion, where the subset of known inheritance relationships describe a particular inheritance path between the given class and the particular class; and
   extracting the subset of known inheritance relationships from the data store and storing the subset of known inheritance relationships in a first non-transitory storage device separate and distinct from the data store.

2. The computer-implemented method of claim 1 further comprises extracting meta-data for a given class contemporaneously with the given class being loaded by an application into a runtime environment.

3. The computer-implemented method of claim 1 further comprises instrumenting, by the instrumentation engine, methods associated with the given class in the bytecode when the given class is determined to meet the criterion.

4. The computer-implemented method of claim 1 wherein determining whether the given class meets the criterion further comprises searching for the particular class amongst the inheritance relationships in the data store starting with the given class and tagging a group of inheritance relationships visited during the search as potentially relevant to the instrumentation process.

5. The computer-implemented method of claim 4 further comprises
identifying inheritance relationships in a direct inheritance path between the given class and the particular class from the group of visited inheritance relationships when the particular class is found during the search; and
changing tags of the identified inheritance relationships from potentially relevant to relevant to the instrumentation process.

6. The computer-implemented method of claim 5 further comprises removing tags from the group of inheritance relationships when the particular class is not found during the search.

7. The computer-implemented method of claim 1 further comprises bundling the one or more inheritance relationships tagged as relevant to the instrumentation process, along with computer-readable instructions for a performance monitoring application, onto a second non-transitory storage device.

8. The computer-implemented method of claim 1 further comprises sending, by the instrumentation engine, notification of an update to the data store via a communication link to an instrumentation manager, where the notification include data pertaining to the one or more tagged inheritance relationships.

9. A non-transitory computer-readable storage medium tangibly storing computer program instructions executable by a computer processor to perform steps comprising:
extracting meta-data for a given class from bytecode for a monitored application, where the extraction occurs contemporaneously with the given class being loaded by the application into a runtime environment;
evaluating the given class in relation to an instrumentation rule, where the instrumentation rule specifies a criterion for classes to be instrumented and is defined in relation to at least one particular class;
determining whether the given class meets the criterion using one or more known inheritance relationships stored in a data store;
tagging the one or more known inheritance relationships as being relevant to the instrumentation process when the given class is determined to meet the criterion, where the subset of known inheritance relationships describe a particular inheritance path between the given class and the particular class;
extracting the subset of known inheritance relationships from the data store and storing the subset of known inheritance relationships in a first non-transitory storage device separate and distinct from the data store; and
instrumenting, by the instrumentation engine, methods associated with the given class in the bytecode when the given class is determined to meet the criterion.

10. The non-transitory computer-readable storage medium of claim 9 wherein determining whether the given class meets the criterion further comprises searching for the particular class amongst the inheritance relationships in the data store starting with the given class and tagging a group of inheritance relationships visited during the search as potentially relevant to the instrumentation process.

11. The non-transitory computer-readable storage medium of claim 10 wherein determining whether the given class meets the criterion further comprises
identifying inheritance relationships in a direct inheritance path between the given class and the particular class from the group of visited inheritance relationships when the particular class is found during the search; and
changing tags of the identified inheritance relationships from potentially relevant to relevant to the instrumentation process.

12. The non-transitory computer-readable storage medium of claim 11 wherein determining whether the given class meets the criterion further comprises removing tags from the group of inheritance relationships when the particular class is not found during the search.

13. A method for generating an inheritance repository for use in performance monitoring across application platforms, comprising:
extracting, by an instrumentation engine, meta-data for a given class from bytecode, where the extraction occurs contemporaneously with the given class being loaded by the application into a runtime environment and the instrumentation engine is implemented by computer-readable instructions executed by a computer processor;
evaluating, by the instrumentation engine, the given class in relation to an instrumentation rule, where the instrumentation rule specifies a criterion for classes to be instrumented and is defined in relation to at least one particular class;
searching, by the instrumentation engine, for the particular class amongst the known inheritance relationships in the data store starting with the given class;
tagging, by the instrumentation engine, inheritance relationships visited during the search as potentially relevant to the instrumentation process;
identifying, by the instrumentation engine, inheritance relationships in a direct inheritance path between the given class and the particular class from the tagged inheritance relationships when the particular class is found during the search;
changing, by the instrumentation engine, tags of the identified inheritance relationships from potentially relevant to relevant to the instrumentation process; and
removing, by the instrumentation engine, tags from the tagged inheritance relationships when the particular class is not found during the search.

14. The computer-implemented method of claim 13 further comprises instrumenting, by the instrumentation engine, methods associated with the given class in the bytecode when the given class is determined to meet the criterion.

15. The computer-implemented method of claim 13 further comprises extracting the tagged inheritance relationships from the data store and storing the tagged inheritance relationships in a first non-transitory storage device separate and distinct from the data store.

16. The computer-implemented method of claim 13 further comprises bundling the inheritance relationships tagged as relevant to the instrumentation process, along with computer-readable instructions for a performance monitoring application, onto a second non-transitory storage device.

17. The computer-implemented method of claim 13 further comprises sending, by the instrumentation engine, notification of an update to the data store via a communication link to an instrumentation manager, where the notification include data pertaining to the one or more tagged inheritance relationships.

18. A system for generating an inheritance repository for use in performance monitoring across application platforms, comprising:
a local inheritance repository operable to store a plurality of known inheritance relationships;

a local instrumentation engine configured to receive bytecode for an application being monitored, the local instrumentation engine operates to extract meta-data for a given class from the bytecode and evaluate the given class in relation to an instrumentation rule, where the instrumentation rule specifies a criterion for classes to be instrumented and is defined in relation to at least one particular class;

the local instrumentation engine operates to identify a subset of the known inheritance relationships being in a particular inheritance path between the given class and the particular class and tagging those inheritance relationships as relevant for the instrumentation process;

the local instrumentation engine further to send a notification via a communication link to an instrumentation server, where the notification include data pertaining to the identified inheritance relationships and the local instrumentation engine is executed by a computer processor of the system; and an instrumentation manager residing on the instrumentation server and configured to receive the notification, wherein the instrumentation manager operates, in response to receiving the notification, to merge the data pertaining to the identified inheritance relationships into a central inheritance repository residing on the instrumentation server.

19. The system of claim 18 wherein the instrumentation manager detects a conflict between the data pertaining to the identified inheritance relationships and data residing in the central inheritance repository and replaces the data residing in the central inheritance repository with applicable data pertaining to the identified inheritance relationships upon detecting a conflict.

20. The system of claim 18 wherein the instrumentation manager, in response to receiving the notification from the local instrumentation engine, sends the notification across a network to a second instrumentation engine, where the notification includes the data pertaining to the identified inheritance relationships and the second instrumentation engine resides on a computing device separate and distinct from the local instrumentation engine.

21. The system of claim 20 further comprises a second inheritance repository residing on the computing device and accessible to the second instrumentation engine, wherein the second instrumentation engine operates, in response to receiving the notification from the instrumentation manager, merges the data pertaining to the identified inheritance relationships into the second inheritance repository.

22. The system of claim 21 wherein the second instrumentation engine detects a conflict between the data pertaining to the identified inheritance relationships and data residing in the second inheritance repository and discards the data pertaining to the identified inheritance relationships upon detecting a conflict.

23. The system of claim 18 wherein the local instrumentation engine operates to identify a subset of the known inheritance relationships being in an inheritance path between the given class and the particular class by searching for the particular class amongst the known inheritance relationships in the local inheritance repository, tagging inheritance relationships visited during the search as potentially relevant to the instrumentation process, identifying inheritance relationships in a direct inheritance path between the given class and the particular class from the tagged inheritance relationships when the particular class is found during the search, and changing tags of the identified inheritance relationships from potentially relevant to relevant to the instrumentation process.

* * * * *